US008764453B2

(12) United States Patent
Swarthout

(10) Patent No.: US 8,764,453 B2
(45) Date of Patent: Jul. 1, 2014

(54) TAIL FEATHER DISPLAY APPARATUS

(75) Inventor: Lance D. Swarthout, Roaring Branch, PA (US)

(73) Assignee: Swarthout Wildlife Mounting Systems, LLC, Roaring Branch, PA (US)

( * ) Notice: Subject to any disclaimer, the term of this patent is extended or adjusted under 35 U.S.C. 154(b) by 21 days.

(21) Appl. No.: 13/506,940

(22) Filed: May 25, 2012

(65) Prior Publication Data

US 2013/0312303 A1 Nov. 28, 2013

(51) Int. Cl.
*A41G 9/00* (2006.01)
*G09B 23/36* (2006.01)
*B44C 5/02* (2006.01)

(52) U.S. Cl.
CPC *G09B 23/36* (2013.01); *A41G 9/00* (2013.01); *B44C 5/02* (2013.01)
USPC ............. 434/296; 40/538; 428/542.4; 428/16

(58) Field of Classification Search
USPC ................... 40/799; 428/16, 6; 434/295–297; 248/126, 247, 248, 300
See application file for complete search history.

(56) References Cited

U.S. PATENT DOCUMENTS

| | | | | |
|---|---|---|---|---|
| 1,997,650 A | * | 4/1935 | Ozmon | 24/49.1 |
| 2,679,711 A | * | 6/1954 | Learnard | 446/27 |
| 5,064,725 A | * | 11/1991 | Acker | 428/542.4 |
| 5,437,935 A | * | 8/1995 | Fredeen | 428/542.4 |
| 6,315,489 B1 | * | 11/2001 | Watanabe | 403/381 |
| 6,451,393 B1 | * | 9/2002 | Ploetz | 428/34.1 |
| D566,614 S | | 4/2008 | Chase | |
| 8,323,756 B2 | * | 12/2012 | Peterson | 428/16 |
| 2003/0082316 A1 | * | 5/2003 | Scott | 428/16 |
| 2013/0045470 A1 | * | 2/2013 | Bain | 434/296 |

* cited by examiner

*Primary Examiner* — Joanne Silbermann
*Assistant Examiner* — Christopher e Veraa
(74) *Attorney, Agent, or Firm* — Thomas R. Shaffer

(57) ABSTRACT

A display for tail feathers of a game bird is provided which includes a wall plate lying in a first plane and a design plate attached to the wall plate. The design plate is spaced apart from the wall plate and is in a second plane parallel to said wall plate. A feather cover plate is attached to the design plate. The feather cover plate is spaced apart from both said wall plate and said design plate and is in a third plane parallel to said wall plate. The wall plate and the feather cover plate form a cavity to receive and hold tail feathers of a game bird.

17 Claims, 7 Drawing Sheets

TAIL FEATHER DISPLAY APPARATUS

BACKGROUND OF THE INVENTION

1. Field of the Invention

The present invention relates to a tail feather display apparatus. More specifically, it relates to a tail feather display apparatus having a design plate displaying a silhouetted scene including a game animal of a same type as the tail feathers to be mounted on the mounting display.

2. Description of the Prior Art

Many men, women and children enjoy the sport of hunting. Many hunters (and some non-hunters) also enjoy displaying entire stuffed game birds or alternatively tail feathers or other parts of game birds as a trophy. Such displays often appear in homes, hunting camps and lodges and can add a rustic ambiance, a western theme or even a somewhat magical or mysterious feel to the room. As used in this patent application, the term "game bird" is defined broadly and includes any bird which has tail feathers which may be displayed. A related display device is disclosed in Applicant's co-pending U.S. patent application Ser. No. 12/925,928 filed Nov. 1, 2010 for Skull Mounting Apparatus. In that application an animal skull mounting apparatus is provided which includes a silhouetted scene including the game animal of the same type as the skull displayed. In the present invention, in one embodiment, a similar silhouetted scene is shown on a display plate of the same type of game bird for which tail feathers are displayed. A variety of other display devices have also been proposed.

Freeden, U.S. Pat. No. 5,437,935 discloses a game bird feather mount that incorporates a frame and a mounting block with predetermined rows of holes for receiving the feathers.

Chase, U.S. Design Pat. D566,614 discloses a full strut turkey plaque.

Scott, U.S. Patent Application No. US 2003/0082316 A1 discloses a turkey trophy display for a turkey feather fantail which includes a rotating carriage for turkey beards.

None of these known devices teach or suggest a tail feather display of the type, and having the features, proposed by the present invention.

There remains a need, and it is an object of the present invention, to provide a tail feather display apparatus which holds the feathers partially behind an aesthetically pleasing feather cover plate.

It is also an object of the present invention to provide a tail feather apparatus which is simple to manufacture and which can be fabricated at a low cost.

It is also an object of the present invention to provide a tail feather display apparatus which includes an artistic silhouetted scene which displays a game bird of the same type as the tail feathers which the apparatus will hold.

SUMMARY OF THE INVENTION

In its simplest form the present invention provides a tail feather display apparatus for tail feathers of a game bird comprising: a) a wall plate lying in a first plane and adapted to be mounted to and to lie flat against a vertical wall; b) a design plate attached to said wall plate, said design plate being spaced apart and lying in a second plane parallel to said wall plate; and c) a feather cover plate attached to said design plate, said feather cover plate being spaced apart from both said wall plate and said design plate and lying in a third plane parallel to said wall plate, said second plane being between said first plane and said third plane, said wall plate and said feather cover plate forming a cavity to receive and hold tail feathers of a game bird.

Preferably, said design plate is attached to said wall plate with a pair of connecting tabs, said connecting tabs being transverse to said design plate and said wall plate.

Preferably, said design plate is attached to said feather cover plate with a connecting plate, said connecting plate being transverse to said design plate and said feather cover plate.

Preferably, said wall plate has a generally semi-annular shape having a wall plate inner diameter edge and a wall plate outer diameter edge.

Preferably, said feather cover plate has a generally semi-circular shape having a feather wall plate outer diameter edge.

Preferably, said wall plate has a generally semi-annular shape having a wall plate inner diameter edge and a wall plate outer diameter edge and said feather cover plate has a generally semi-circular shape having a feather wall plate outer diameter edge. Preferably, said wall plate outer diameter is equal to said feather cover plate inner diameter. Preferably, said wall plate outer diameter edge and said feather cover plate inner diameter edge each have a decorative scalloped shape.

Preferably, said wall plate and said feather cover plate are formed from a single sheet of metal. More preferably, said wall plate, said connecting tabs, said connecting plate and said feather cover plate are all formed from a single sheet of metal. Still more preferably, said wall plate, said connecting tabs, said connecting plate, said feather cover plate and said display plate are all formed from a single sheet of metal.

Preferably, the display apparatus also includes a backing block mounted to a rear side of said display plate. Preferably, said backing block is formed of wood.

Preferably, said design plate displays a silhouetted scene including a game bird of a same type as the tail feathers to be mounted on said mounting display.

Preferably, said design plate has a generally oval shaped opening therein in which a game bird is depicted.

Preferably, the display apparatus further includes a game bird beard mounting attachment which may include a semi-cylindrical beard cover under which a top portion of a game bird beard is attached.

Preferably, the display apparatus further includes a pair of hooks for mounting game bird talons.

DETAILED DESCRIPTION OF THE PREFERRED EMBODIMENTS

Figure 1:
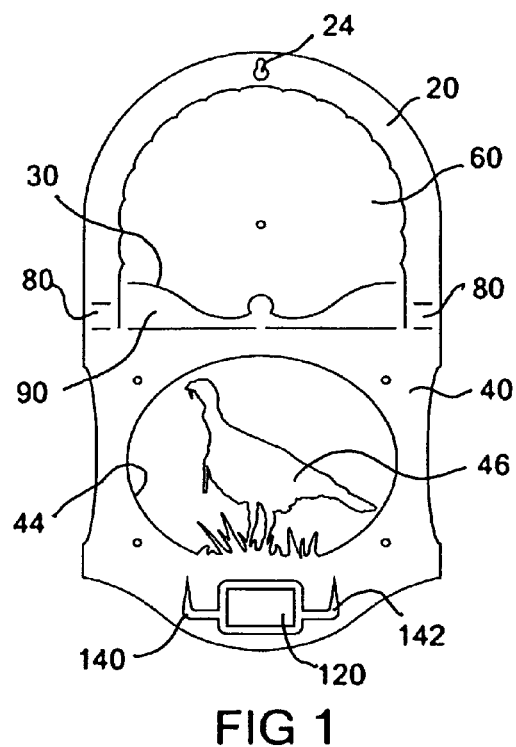
FIG. 1 is a front view of a metal sheet out of which the tail feather display apparatus of the present invention is formed.

Referring to FIGS. 1 through 4, the tail feather display apparatus of the present invention includes a wall plate 20 which lies in the first vertical plane 22. The wall plate 20 is adapted to lie flat against a vertical wall 10 and is hung on the wall by means of a hanging slot 24 provided in the top of the wall plate 20. The wall plate has a semi-annular configuration and shape and includes an inner diameter edge 28 and an outer diameter edge 26. The inner diameter edge 24 is preferably scalloped and is formed along a cut line 30.

The tail feather display apparatus of the present invention also includes a design plate 40 which lies in a second vertical plane 42. As shown in FIG. 1 the display plate 40 preferably has an oval shaped opening 44 therein into which a silhouette image of the game bird 46 is displayed. The design plate 40 may also include a game bird beard mounting attachment 120 and hooks 140 and 142 used to attach bird talons.

Figure 2:
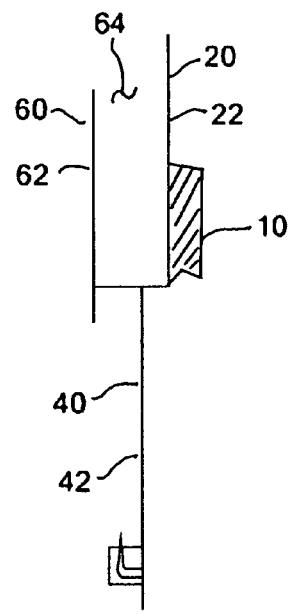
FIG. 2 is a side view of the tail feather display apparatus of FIG. 1 as mounted to a vertical wall.
Figure 3:
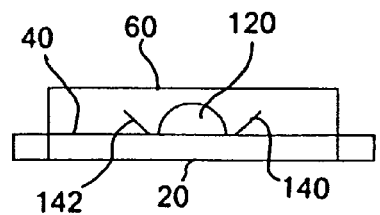
FIG. 3 is a top view of the tail feather display apparatus of FIG. 2.
Figure 4:
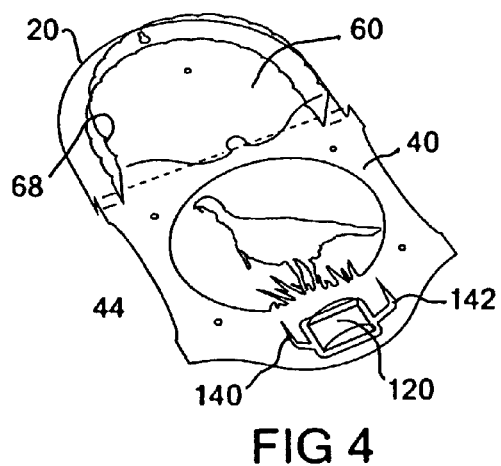
FIG. 4 is a perspective view of the tail feather display apparatus of FIG. 2

A feather cover plate 60 is provided which lies in a third vertical plane 62. The feather cover plate 60 and the wall plate 20 form a cavity 64 into which the game bird tail feathers are placed and are held in position by the friction fit or by a mounting pin inserted into mounting hole 69. As best shown in FIG. 2, the second vertical plane 42 is parallel to and located between both the first vertical plane 22 in the third vertical plane 62. As best shown in FIG. 1, the feather cover plate 60 is semi-circular in shape and has an outer diameter edge 68 which has a scalloped configuration.

Figure 5:
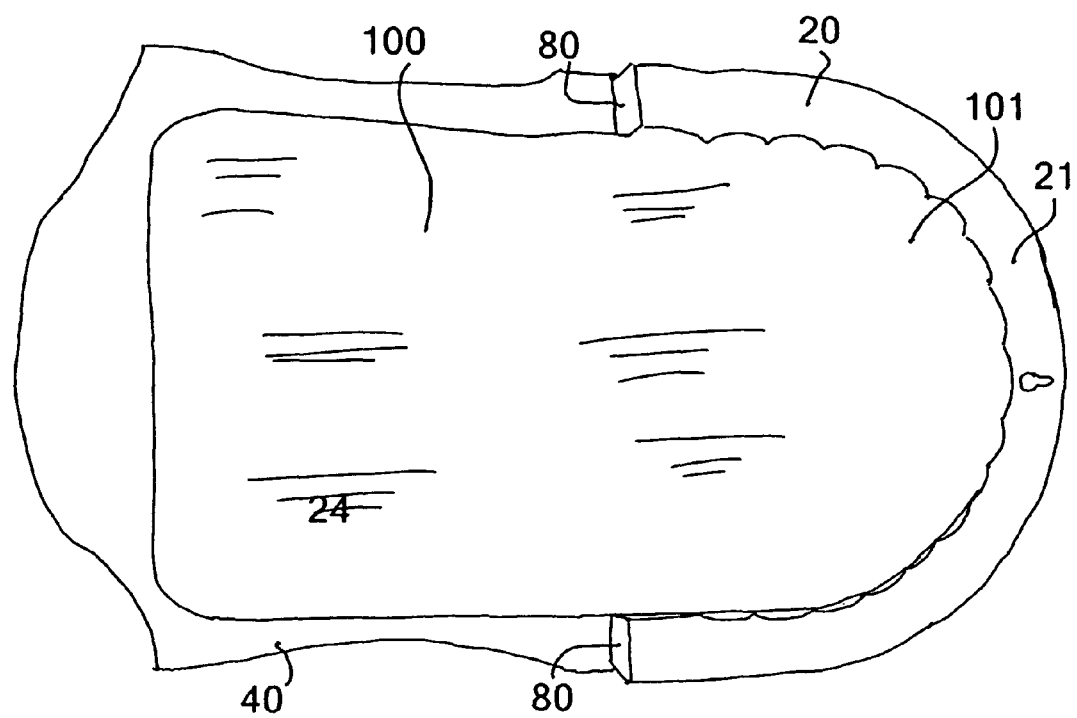
FIG. 5 is a back view of the tail feather display apparatus of FIG. 2 also showing an attached backing block.

Referring to FIG. 5, a back view of the tail feather display apparatus is shown. The backing block 100 is preferably positioned over the central portion of the back of the tail feather display apparatus. This backing block is preferably made from wood which has an attractive grain which adds to the aesthetic beauty of the tail feather display apparatus. In FIG. 5, the back surface 101 of the backing block 100 is co-planar with the back surface 21 of wall plate 20. In other words, the backing block 100 preferably has a thickness equal to the horizontal length of the connecting tabs 80.

Figure 6:
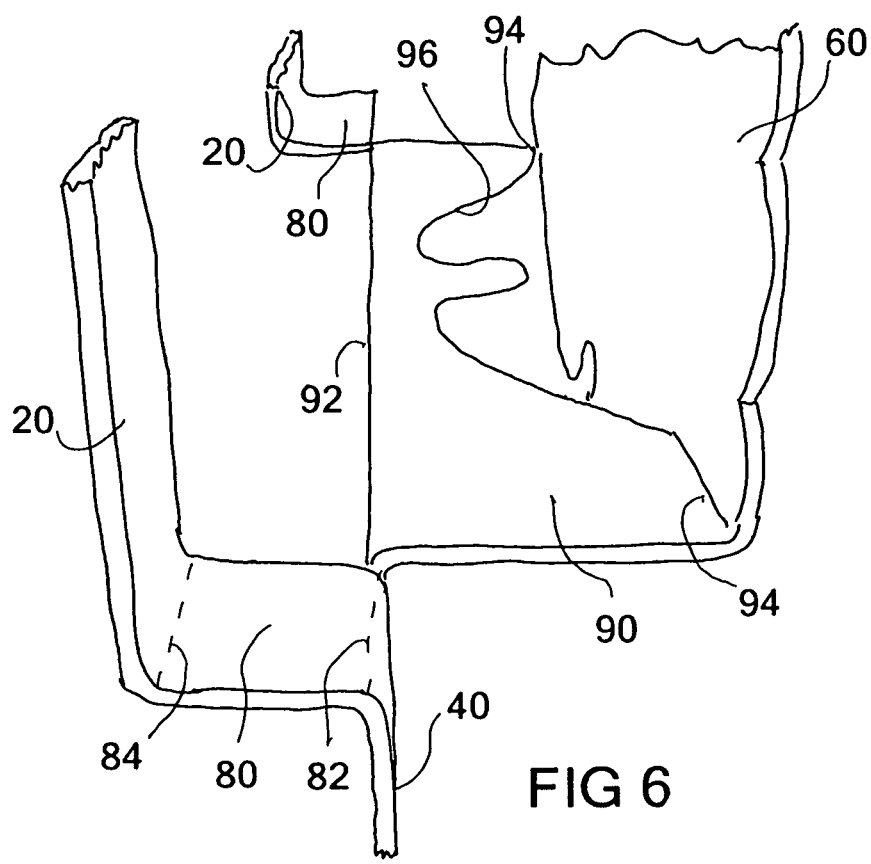
FIG. 6 is a perspective view of a portion of a tail feather display apparatus showing the horizontal orientation of connecting tabs and a connecting plate.

Referring to FIG. 6, it can be seen that the wall plate 20 is attached to the display plate 40 by means of connecting tabs 80. With wall plate 20 mounted to a vertical wall 10, connecting tabs 80 are first bent outwardly away from the wall along fold line 84 and are then bent downwardly along fold line 82. It can also be seen that the display plate 40 is attached to the feather cover plate 60 by means of a connecting plate 90. Connecting plate 90 is folded outwardly away from the display plate 40 along fold line 92. The feather cover plate 60 is folded upwardly away from the horizontal connecting plate 90 along fold lines 94. With this arrangement, the wall plate 20, display plate 40 and feather cover plate 60 are each in a separate vertical plane and the connecting tabs 80 and the connecting plate 90 are in a co-planar horizontal plane.

Figure 7:
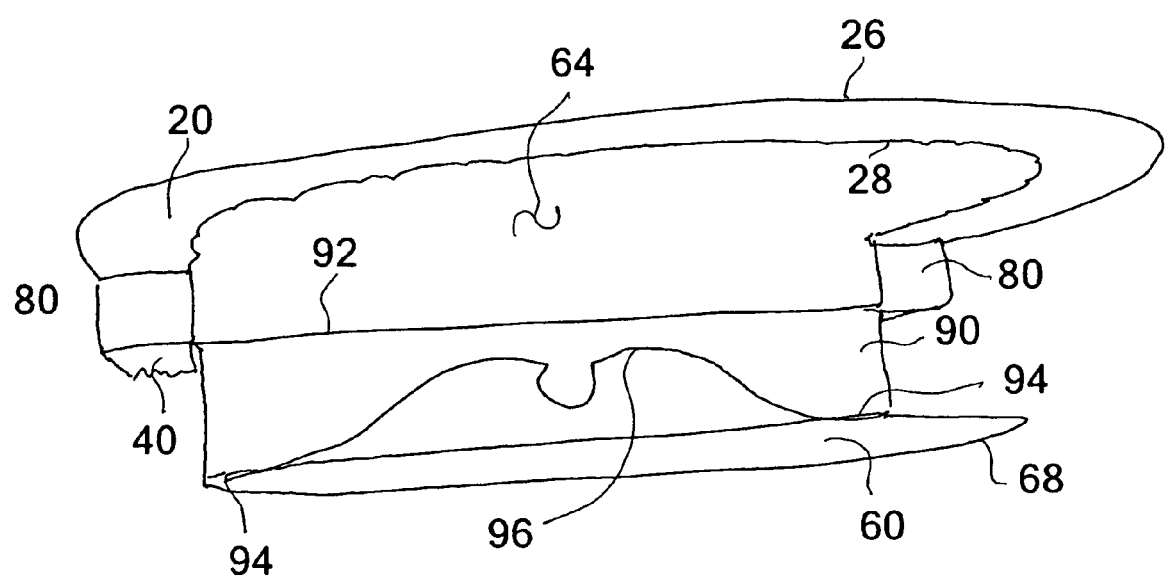
FIG. 7 is a top perspective view of a portion of tail feather display apparatus showing the location of a cavity into which the tail feathers are placed.

Referring to FIG. 7, the top perspective view shows the location of the cavity 64 into which the game bird tail feathers are placed.

Figure 8:
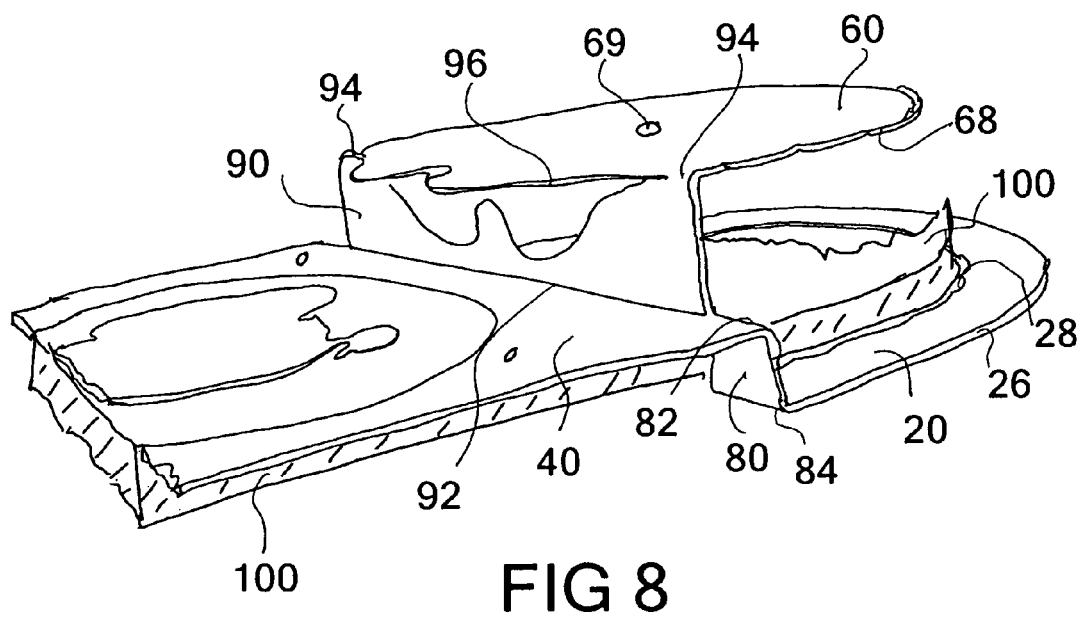
FIG. 8 is a side perspective view of a portion of a tail feather display apparatus showing the location of an attached backing block.

Referring to FIG. 8, a side perspective view shows the configuration of the wall plate 20, designed plate 40, and feather cover plate 60 relative to the backing block 100

Figure 9:
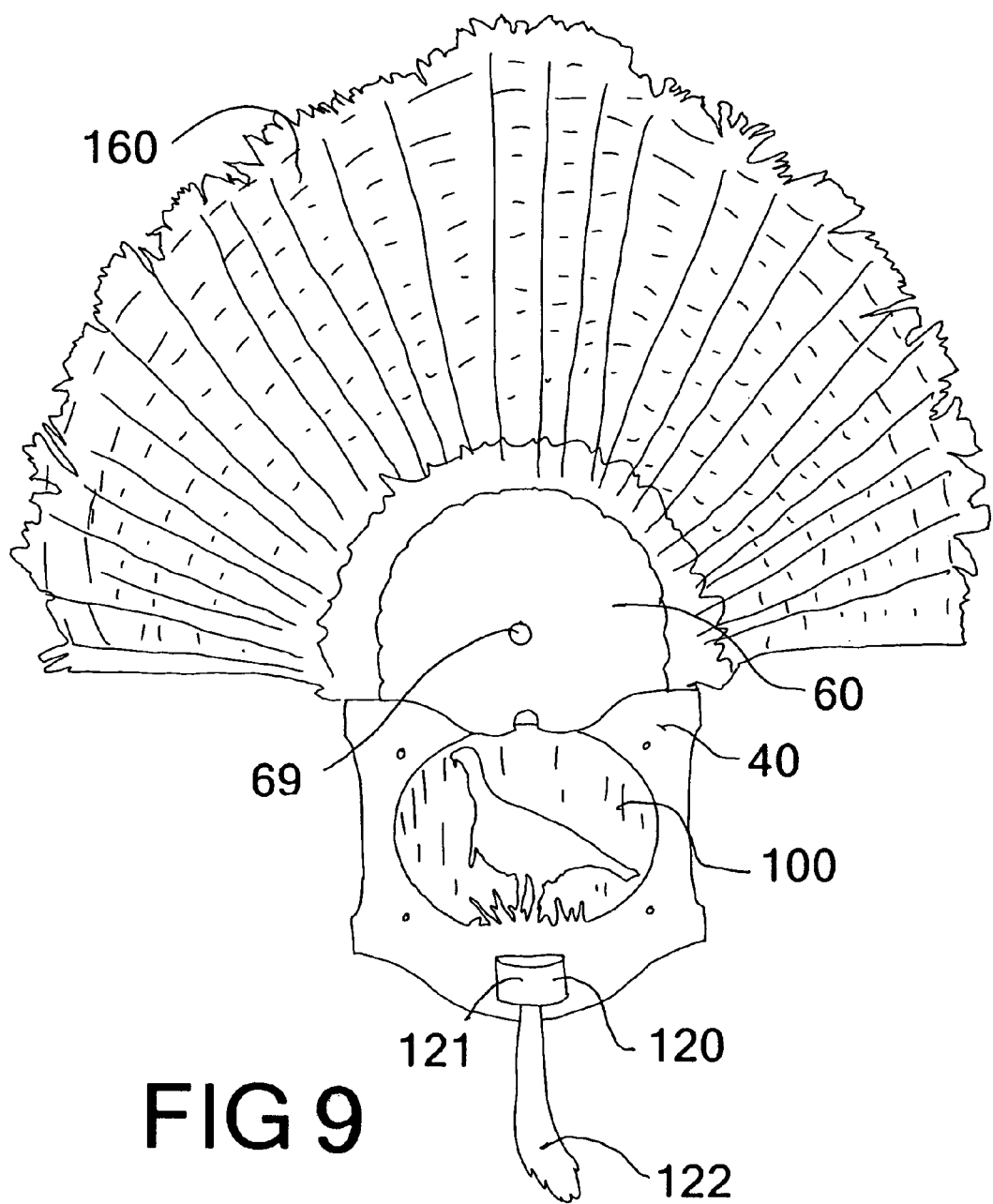
FIG. 9 is a front view of a tail feather display apparatus showing an attached turkey feather fan and having a display plate showing a silhouette view of a turkey standing in grass.

FIG. 9 shows a front view of a tail feather display apparatus according to the present invention showing a fan of turkey feathers 160 mounted behind the feather cover plate 60 and also showing the turkey beard 122 mounted in the beard mounting attachment 120. As shown, the beard mounting attachment 120 includes a semi-cylindrical cover 121 which covers up the top of the turkey beard 122.

Figure 10:
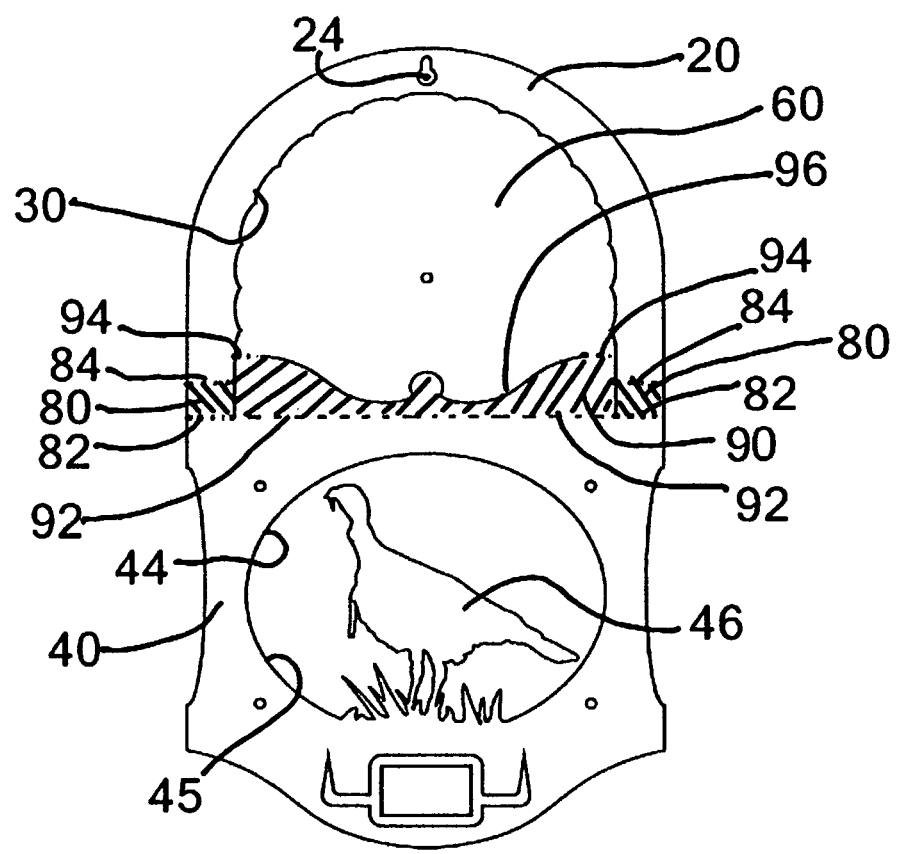
FIG. 10 is a front view of a metal sheet out of which a tail feather display apparatus is formed showing various fold and cut lines.

Referring to FIG. 10, a front view of the metal sheet out of which the tail feather display apparatus is formed is shown. This figure shows that tabs 80 are bent along fold lines 82 and 84. Connecting plate 90 is bent along fold lines 92 and 94. A cutline 96 is provided along a portion of the boundary between feather cover plate 60 and connecting plate 90. A cutline 30 is provided along the arched border between the wall plate 20 and the feather cover plate 60. A cutline 45 in the display plate 40 provides an oval opening 44. A cutline 46 in the shape of a turkey walking in short grass is utilized to provide a silhouette of a turkey. While the present invention prefers to provide a silhouette image of the game bird, the display plate 40 may be utilized for any purpose or may simply be left blank.

It is to be understood that while certain forms of the present invention have been illustrated and described herein, the present invention is not to be limited to the specific forms or arrangements of parts described and shown.

I claim:

1. A display apparatus for a fan of tail feathers of a game bird comprising:
   a) a wall plate lying in a first plane and adapted to be mounted to and to lie flat against a vertical wall;
   b) a design plate attached to said wall plate, said design plate being spaced apart and lying in a second plane parallel to said wall plate; and
   c) a feather cover plate attached to said design plate, said feather cover plate being spaced apart from both said wall plate and said design plate and lying in a third plane parallel to said wall plate, said second plane being between said first plane and said third plane, said wall plate and said feather cover plate forming a cavity to receive and hold a fan of tail feathers of a game bird; wherein said design plate is attached to said wall plate with a pair of connecting tabs, said connecting tabs being transverse to said design plate and said wall plate; wherein said design plate is attached to said feather cover plate with a connecting plate said connecting plate being transverse to said design plate and said feather cover plate; wherein said wall plate, said connecting tabs, said connecting plate, said feather cover plate and said display plate are all formed from a single sheet of metal; and wherein said display apparatus further comprises a backing block mounted to a rear side of said display plate.

2. A display apparatus according to claim 1 wherein said design plate is attached to said wall plate with a pair of connecting tabs, said connecting tabs being transverse to said design plate and said wall plate.

3. A display apparatus according to claim 1 wherein said design plate is attached to said feather cover plate with a connecting plate, said connecting plate being transverse to said design plate and said feather cover plate.

4. A display apparatus according to claim 1 wherein said wall plate has a generally semi-annular shape having a wall plate inner diameter edge and a wall plate outer diameter edge.

5. A display apparatus according to claim 1 wherein said feather cover plate has a generally semi-circular shape having a feather cover plate outer diameter edge.

6. A display apparatus according to claim 1 wherein said wall plate has a generally semi-annular shape having a wall plate inner diameter edge and a wall plate outer diameter edge and wherein said feather cover plate has a generally semicircular shape having a feather wall plate outer diameter edge.

7. A display apparatus according to claim 6 wherein said wall plate outer diameter is equal to said feather cover plate inner diameter.

8. A display apparatus according to claim 6 wherein said wall plate outer diameter edge and said feather cover plate inner diameter edge each have a decorative scalloped shape.

9. A display apparatus according to claim 1 wherein said wall plate and said feather cover plate are formed from a single sheet of metal.

10. A display apparatus according to claim 1 wherein said wall plate, said connecting tabs, said connecting plate and said feather cover plate are all formed from a single sheet of metal.

11. A display apparatus according to claim 1 wherein said wall plate, said connecting tabs, said connecting plate, said feather cover plate and said silhouette display plate are all formed from a single sheet of metal.

12. A display apparatus according to claim 1 further comprising a backing block mounted to a rear side of said display plate whereby said backing block is visible through a portion of the display plate which has been removed.

13. A display apparatus according to claim 12 wherein said backing block is formed of wood.

14. A display apparatus according to claim 1 wherein said design plate has a cut out portion which is removed from the design plate and a remaining portion whereby the remaining portion of said design plate displays a silhouetted scene including a game bird of a same type as the fan of game bird tail feathers to be mounted on said mounting display.

15. A display apparatus according to claim 14 wherein said design plate has a generally oval shaped opening therein in which a game bird is depicted.

16. A display apparatus according to claim 1 further comprising a game bird beard mounting attachment.

17. A display apparatus according to claim 1 further comprising a pair of hooks for mounting game bird talons.

\* \* \* \* \*